United States Patent [19]

Lu et al.

[11] Patent Number: 5,961,860
[45] Date of Patent: Oct. 5, 1999

[54] PULSE LASER INDUCED REMOVAL OF MOLD FLASH ON INTEGRATED CIRCUIT PACKAGES

[75] Inventors: Yong Feng Lu; Daniel Siu Hung Chan; Teck Seng Low, all of Singapore, Singapore

[73] Assignee: National University of Singapore, Singapore

[21] Appl. No.: 08/456,298

[22] Filed: Jun. 1, 1995

[51] Int. Cl.[6] ................................................. B23K 26/00
[52] U.S. Cl. .............................. 219/121.65; 219/121.68; 219/121.69; 219/121.83; 264/166
[58] Field of Search ......................... 219/121.65, 121.85, 219/121.68, 121.61, 121.83, 121.75; 264/166, 276

[56] References Cited

U.S. PATENT DOCUMENTS

| 4,609,566 | 9/1986 | Hongo et al. ............................ 427/53.1 |
| 4,803,021 | 2/1989 | Werth et al. . |
| 4,854,696 | 8/1989 | Guez ................................... 219/121.68 |
| 4,978,830 | 12/1990 | Millerick et al. . |
| 5,038,950 | 8/1991 | Yahagi ................................ 219/121.64 |
| 5,070,039 | 12/1991 | Johnson et al. . |
| 5,070,041 | 12/1991 | Katayama et al. . |
| 5,099,101 | 3/1992 | Millerick et al. . |
| 5,187,967 | 2/1993 | Singh et al. . |
| 5,296,674 | 3/1994 | Praschek et al. ................... 219/121.69 |
| 5,512,123 | 4/1996 | Cates et al. ........................... 156/272.6 |

FOREIGN PATENT DOCUMENTS

ORK009  7/1993  Japan .

OTHER PUBLICATIONS

Lu et al "Laser–Induced Dry Cleaning in Air—A New Surface Cleaning Technology in Lieu of Carbon Fluorochloride (CFC) Solvents", Jpn. J. Appl. Phys., vol. 33, No. 3B, Mar. 15, 1994, pp. L430–L433.

*Primary Examiner*—Mark H. Paschall
*Attorney, Agent, or Firm*—Birch, Stewart, Kolasch & Birch, LLP.

[57] ABSTRACT

A dry process to remove mold flash on integrated circuit packages (IC packages) by using pulse, short wavelength laser irradiation. The mold remnants on the surface or in holes of the lead frame can be removed by pulse laser irradiation, with the effect of thermal expansion of lead frame metals and momentum transferring from the laser beam to the mold remnants. Compared with conventional water jet or etching processes, the new technique has high productivity and does not degrade the reliability of the IC packages, due to the fact that there is no water or chemical solutions involved in the process.

17 Claims, 6 Drawing Sheets

PULSE LASER INDUCED REMOVAL OF MOLD FLASH ON INTEGRATED CIRCUIT PACKAGES

FIELD OF THE INVENTION

This invention relates to a dry process to remove mold flash on a lead frame of an IC package or other electronic components, by using pulse laser irradiation at short wavelength. The mold remnants on a lead frame of IC packages can be selectively removed by short wavelength pulse laser irradiation in the air.

BACKGROUND OF THE INVENTION

Conventionally, mold flash on the lead frame of an IC package is removed and cleaned by high pressure water jet sputtering or wet etching in chemical solutions.

In the case of water jet sputtering, high pressure water (with several thousand atmospheric pressure) is formed to be a water jet by a fine nozzle. This water jet is then directed to the region (on lead frame of IC package) where mold remnants exist. The water remaining on the IC chips is dried away in the subsequent step.

Another method of removing mold flash is chemical etching. The chips are put in a chemical solution for a certain period of time while the flash part is etched away. The chips are then rinsed and dried in subsequent processes.

The two methods mentioned above, especially the water jet sputtering, are effective and currently used in industry to remove the mold flash from IC packages and other electronic components. However, they have some disadvantages which significantly affect the productivity of flash removal and reliability of the IC chips in manufacturing.

For water jet sputtering, high cost and subsequent drying are the main drawbacks of the technology. In order to obtain high pressure water, a high-price water compressor has to be used to pump water to several thousand atmospheric pressures. Meanwhile, the jet nozzle is worn out in a short period of time (within a few hours) due to the small nozzle size and high water pressure. Use of a high pressure water pump and frequent changing of the jet nozzle increase the cost of the process. Furthermore, the wet chips after flash removal have to be dried in a subsequent process which also increases the cost and reduces the productivity.

The method of wet etching in chemical solutions to remove mold flash also has several problems. First of all, the chemical solution to etch the mold flash away can also be corrosive to the IC package and to the metal lead frame. The chemical solution may penetrate into the IC package to degrade the reliability of the IC chips. Secondly, metal is chemically more active than the mold material. Thereafter, it is difficult to find a chemical solution which is chemically more active to the mold material but less active to the lead metal. This method also requires water rinse and a subsequent drying process. Therefore, this method is even worse than the previous one in terms of cost and productivity.

This invention is aimed to solve the above-mentioned problems by using a laser as an energy source to remove mold flash. It is a dry process in air which does not need sophisticated equipment and a subsequent drying process. Therefore, the new method has high productivity and low cost. Furthermore, this new method does not have pollution such as noise and toxic chemical gases or solutions.

A known laser trimming system for semiconductor integrated circuit chip packages is disclosed in U.S. Pat. No. 5,099,101 to Millerick et al. The device of Millerick et al uses a YAG laser which has a wavelength of 1.06 micrometer. The mold flash is removed by "vaporization" which is a pure thermal process. A disadvantage of this system is that the high temperature rise can cause the mold flash to be carbonized and the lead frame to be oxidized. The existence of the carbon residual can cause a reliability problem because the carbon residual is electrically conductive when the humidity is high. At the same time, the oxidation of the lead frame can cause problems in electrical connection. Because of these disadvantages, this technique is not widely used in industry.

The Millerick et al device also discloses a monitoring system including a CCD camera and an image processor. This system requires illumination and the resolution is limited by the pixel of the image processor. Therefore, the monitoring system suffers from the disadvantage that the pattern edges cannot be defined efficiently with high resolution.

SUMMARY OF THE INVENTION

In the present invention, a pulse laser with short wavelength is used to irradiate the area where mold flash is attached. All the mold flash is then sputtered and removed away by the interaction with short wavelength laser pulses.

Appropriate parameters such as intensity, pulse width and wavelength are selected for a laser with short wavelength and pulse width. The area on the IC lead frame attached with mold flash is selectively irradiated by the pulse laser with the selected parameters. By the large instant momentum of the laser pulses applied on the mold flash together with the large thermal expansion of the lead metal, the mold flash on the lead frame can be removed away from the metal surface, the lead frame then becomes completely clean.

Therefore, the conventional water jet sputtering and chemical etching methods can be replaced by this new technology to use pulse laser to remove mold flash which is a productive and efficient dry process. The disadvantages, such as high cost, low productivity and degradation of IC reliability can also be avoided.

Furthermore, it is an object of the present invention to provide a dry process to remove mold flash on a lead frame of an IC package or other electronic components which overcomes the disadvantages of known methods of laser trimming IC packages which contribute to carbonization of the mold flash and oxidization of the lead frame.

It is yet another object of the present invention to provide a mold flash removal monitoring system which is low in cost and which achieves a high resolution.

The above and other objects of the present invention are achieved by a short wavelength laser apparatus for removing mold flash from a substrate, comprising: a short wavelength laser generator, wherein a wavelength of a laser beam generated by said laser generator is less than 550 nm; an aperture through which the laser beam generated by said laser generator is passed; a focusing lens for focusing the laser beam after the beam passes through said aperture; a transparent holding means for holding a substrate while the substrate is treated with a focused laser beam; and a monitoring means for monitoring the removal of mold flash from the substrate; wherein said laser beam removes mold flash by both heating the mold flash and providing a momentum hit on the mold flash.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT(S)

This invention relates to a method of removing mold flash from a lead frame of an IC package and lead wire of other electronics components.

According to the present invention, the mold flash on the lead frame of an IC package and other electronics components is removed by pulse laser irradiation at short wavelength. This method is a dry process in air. It does not require expensive facilities and subsequent processes to rinse and dry I.C. packages. Therefore, this new technology is superior to conventional methods in terms of productivity and cost efficiency.

In the following text, the new method for laser-induced mold flash,. removal in this invention is explained in detail.

Figure 1:
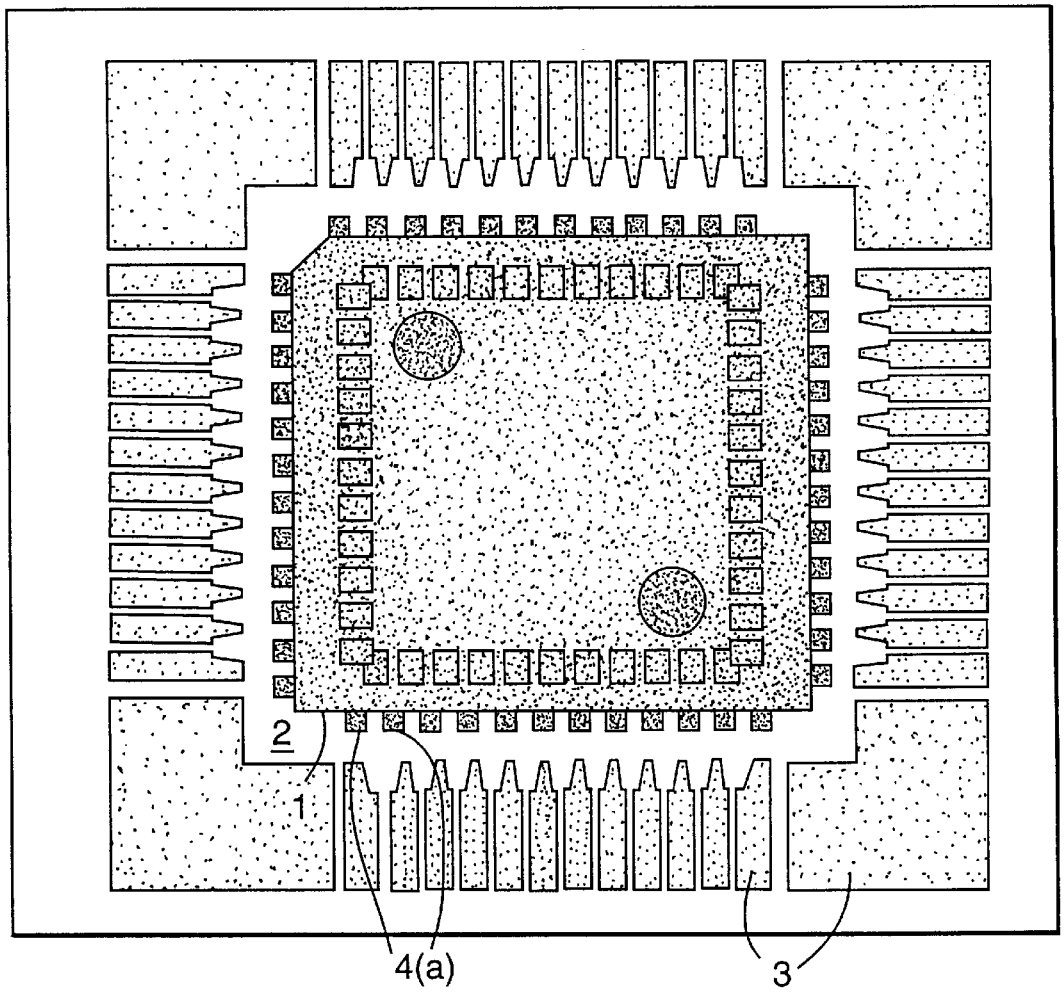
FIG. 1 illustrates a schematic diagram of the IC (integrated circuit) package with the mold flash on the lead frame before laser removal.
Figure 2:
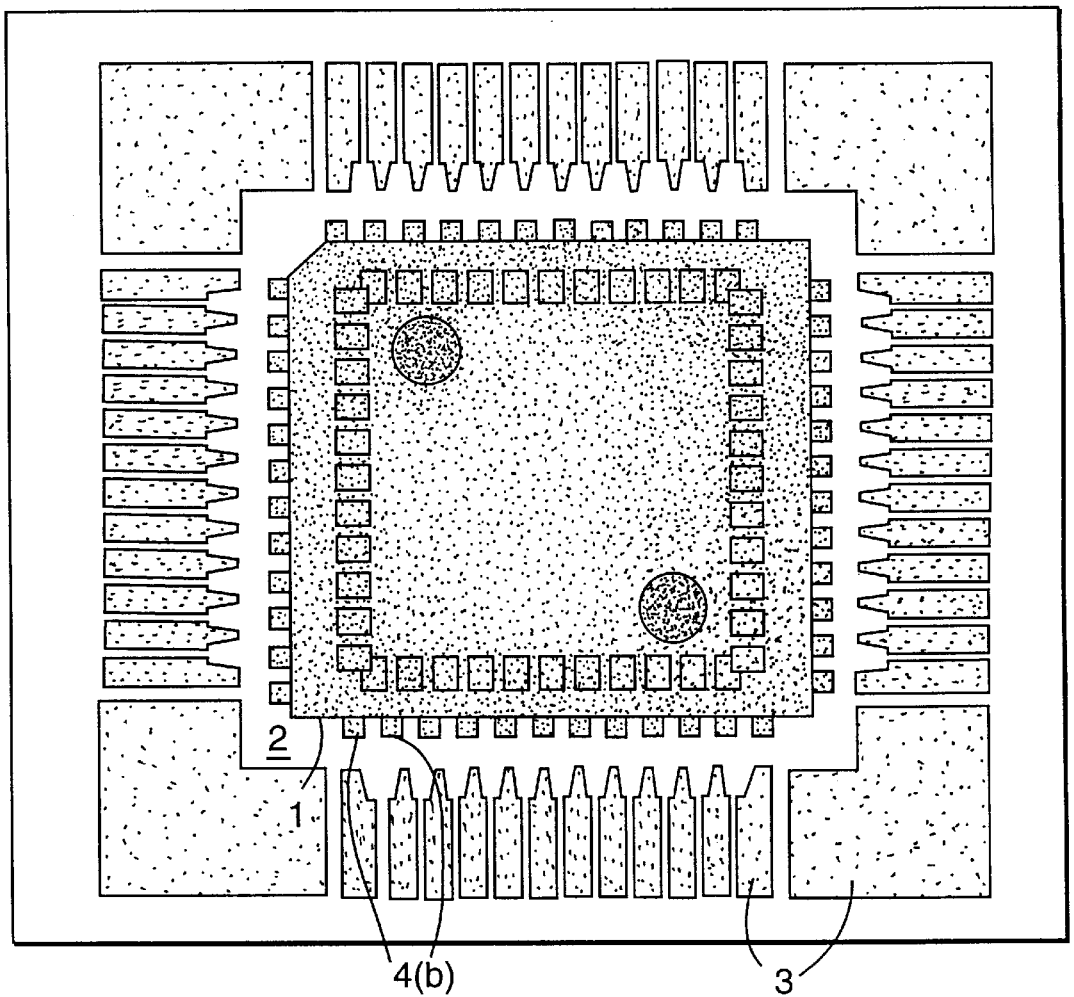
FIG. 2 illustrates a schematic diagram of the Integrated package after the mold flash is removed by laser irradiation.

FIGS. 1 and 2 illustrate the task to be carried out by the technology developed in this invention. FIG. 1 shows a schematic diagram of an IC (integrated circuit) package with the mold flash on the lead frame before laser removal. In this figure, the central area (1), the circumferential area (2) and the outer area (3) illustrate regions of a molded package (1), the lead frame and lead pins (2), and the void regions (3), respectively. The projections (4a) illustrate the mold flash (4a) filled in the holes at the lead-package interface region. This invention relates to the technology to remove the mold flash (4a) projections attached on the lead frame metal and in the interface holes.

In laser irradiation, parameters are properly chosen to remove all of the mold flash (4a) on the, lead frame surface (2) and in the interface holes (4a). FIG. 2 shows a schematic diagram of the IC (integrated circuit) package after the mold flash (4a) is removed by laser irradiation. In this figure, the central area (1), the circumferential area (2) and the outer area (3) are the regions of molded package (1), lead frame and lead pins (2), and the void regions (3) as in FIG. 1. All the mold flash (4a) is removed from the surface of the lead frame metal and from the interface holes. The interface holes will become void holes (4b) after laser irradiation (drawn in light gray color).

Figure 3:
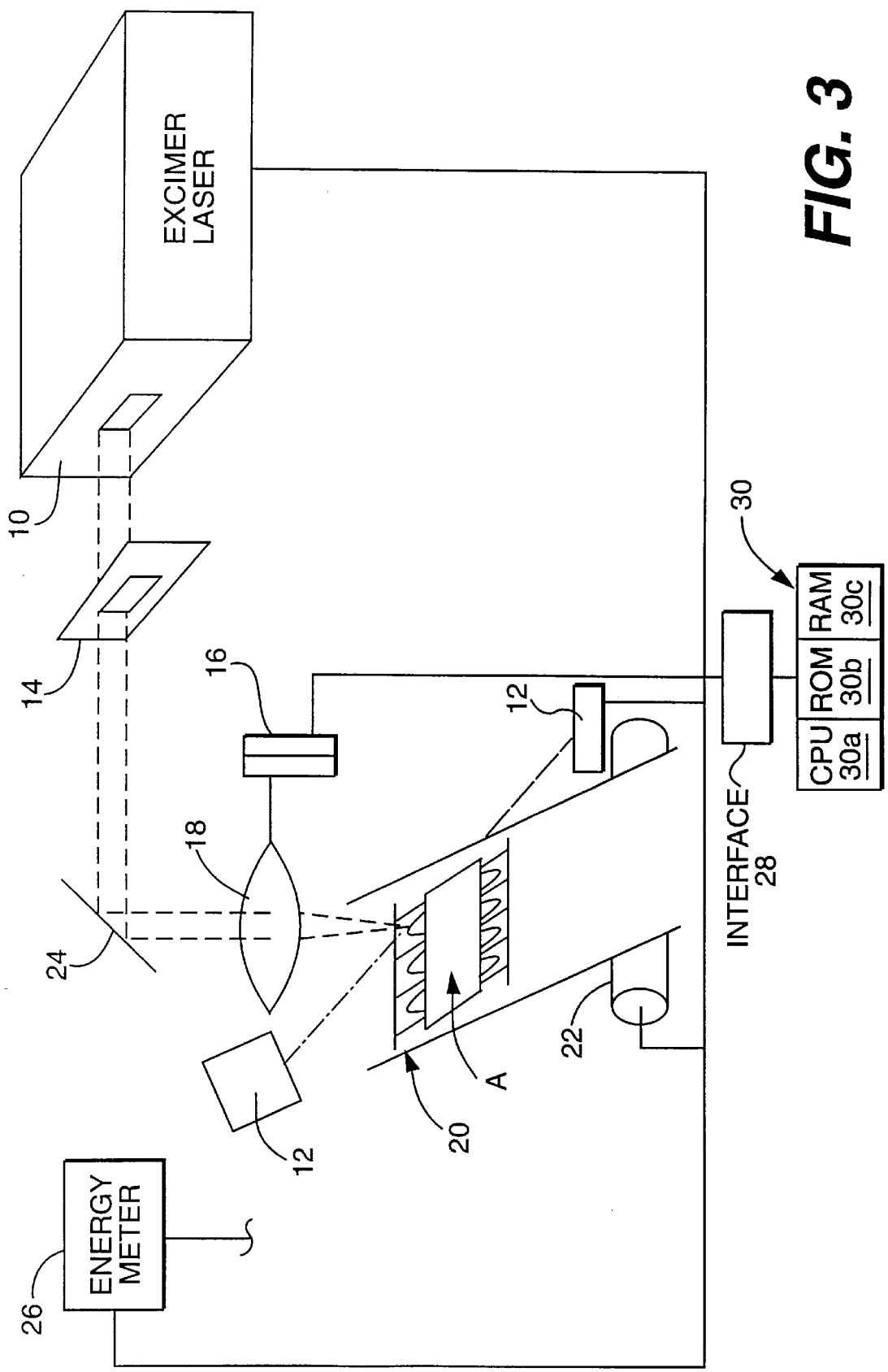
FIG. 3 illustrates a schematic diagram of the laser system used to remove the mold flash from IC packages.
Figure 4:
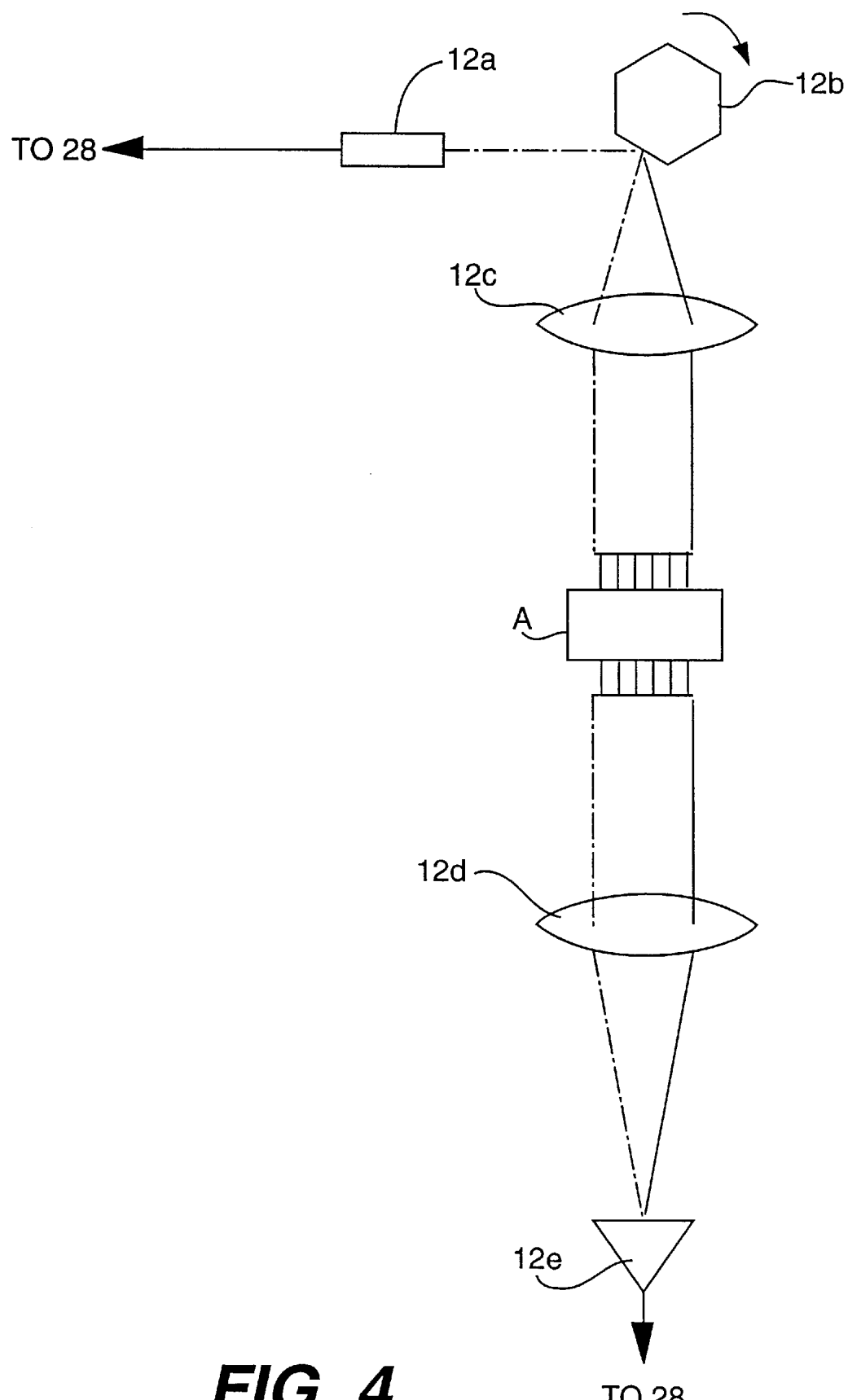
FIG. 4 illustrates a schematic diagram of the real-time detection system to monitor the removal of mold flash.

FIGS. 3 and 4 illustrate the setup of the system used in this invention. FIG. 3 shows the schematic diagram of the system used to remove the mold flash from IC packages and other electronics components. The details of the real-time monitoring system (12) are shown in FIG. 4.

In the system of FIG. 3, a pulse laser generator (10) (KrF excimer laser is used in the implementation) is used to generate a pulse beam with a short wavelength. The pulse laser 10 is a KrF excimer laser from this KrF excimer laser generator (10), a pulsed laser beam is generated with a wavelength of 248 nm and a pulse width of 20 ns.

Furthermore, in this mold flash removal system, the size and shape of the pulse beam from the KrF excimer laser generator (10) is controlled by an electrically and automatically controlled aperture (14). A plano-convex quartz lens (18) is placed on an electric stage (16) which is movable to focus or defocus the beam (to reduce or enlarge the beam size) for the purpose of adjusting the beam size and intensity. The beam size and the intensity on the substrate surfaces can be finally controlled by both the aperture (14) and the lens (18). Substrates A (IC packages or other electronics components) are placed on a belt conveyor (20) and move in sequence for laser removal of the mold flash. The moving speed of the belt conveyor (20) can be adjusted by a speed controller (22). A pulse beam from the lens (18) can be finally directed on the substrates A on the belt conveyor (20) by a mirror system (24). The total energy of the pulse beam can be detected by an energy meter (26).

The beam size and intensity of the pulse beam directed on substrate surfaces A can then be adjusted by electronically controlled aperture (14) and the position of focusing lens (18).

The KrF excimer laser generator (10), electronically controlled aperture (14), electric stage (16), speed controller (22), and energy meter (26) are connected to a central computer (30), with CPU 30a, ROM 30b and RAM 30c, by an interface (28).

A real-time monitoring system (12) is installed to monitor the removal process of the mold flash. The output from this monitoring system is sent to the interface (28) and central computer (30a, 30b, 30c). This monitoring system provides information for the CPU (30a) to control the parameters for mold flash removal.

In ROM (30b), the frequency of the pulse beam from the excimer laser generator (10), the size and the shape of the aperture (14), the position of the lens (18) on the stage (16), and the velocity of the belt conveyer (20), controlled by the speed controller (22), carrying the substrates (A) and other parameters can be memorized in programs for an optimized condition which is to be used to clean specific mold flash. For most of the mold-flash/lead-metal system, there is a parameter window to remove the mold flash completely and efficiently.

RAM (30c) is used as working area for CPU (30a) to execute the programs which have been memorized in ROM (30b).

This dry processing system is setup to remove the mold flash, without involving gas, solutions or vacuums. This provides a good feasibility for various applications with low cost.

By the above-described system, the frequency of the pulse beam from the KrF excimer laser generator (10), the shape and size of the electronic aperture (14), the position of the lens (18) which is positioned by the electric stage (16), and the moving speed of the belt conveyer (20) which is adjusted by the speed controller (22) can be appropriately selected by the central computer (30), according to the information obtained from the real-time monitoring system (12). The mold flash on the substrate (A) can be removed under an optimized condition to those specific mold-lead systems.

FIG. 4 shows the real-time monitoring system for the process to remove the mold flash. A semiconductor laser (12a) is used as a laser source for the detection beam. The laser beam from the semiconductor laser (12a) is scanned along one direction by a hexagonal laser scanner (12b). The laser beam from the scanner (12b) is then focused by a convex lens (12c).

The distance between the scanner (12b) and the lens (12c) is set to be the same as the focal length of the lens (12c). As a result, the laser beam moves vertically from the left side (dashed path) to the right side (solid path). The sample (A) to be checked is placed on the belt conveyer in a plane which is the same as the focal plane of the lens (12c). The beam spot of the detection laser can be focused to around 20 micrometer by this setup at the focal plane. The detection accuracy is therefore around 1 or 2 micrometer.

The belt conveyer (20) which holds the sample (A) is transparent. The detection beam can then go down to reach the second lens (12d). The second convex lens (12d) has the same focal distance as the first convex lens (12c). The laser beam is then directed to the focal point of the second lens (12d) and detected by a photo detector (12e), with original beam size as from the semiconductor laser (12a). Both the semiconductor laser (12a) and photodetector (12e) are connected to the interface (28) and the CPU (30) to send information of the monitoring system (12). The size of the void region on the lead frame of the IC package (A) can then be obtained. From this result, the monitoring system can provide information to the CPU in order to determine whether all of the mold flash in the interface holes has been totally removed.

The real-time monitoring system requires no illumination. Furthermore, it is suitable to monitor IC packages with different shapes and colors. Because the IC package is placed in the focal plane of a convex lens, a high resolution in micro order can be realized with this system.

Therefore, a sharp edge image can be obtained and the system can monitor the deflash process more efficiently and accurately. At the same time, the electrically-controlled aperture (14) can change its shape and size according to the dimensions of the mold flash. Together with the focusing lens (18), a minimum amount of laser energy is deposited on the IC package to avoid over heating of the irradiated area.

With the selected condition, when the mold flash area on the IC package (A) is irradiated by the pulse beam from the excimer laser generator (10), the mold flash on the lead frame of the IC package (A) can be removed by the following two mechanisms. One mechanism is that the laser beam is used as a heat source. Under the laser irradiation, the region with mold flash is heated up. Thermal expansion for the lead frame and the mold flash can be expected. Because of the difference between the expansion coefficient of the lead frame metal and that of the mold flash, the lead frame metal usually expands more than the mold flash does. Therefore, the mold flash can be cleaved away from the lead frame metal.

The second mechanism is that the laser beam is used as a momentum source. Due to the high instant laser power within the laser pulse, the momentum hit on the mold flash can be very large. Photons with short wavelength have large photonic energy and momentum. Furthermore, pulse lasers with short wavelength can be used for surface cleaning to remove organic and inorganic contaminants. The photons with high energy can break the physical and chemical bonds of surface contaminants, and therefore decompose the surface contaminants and clean the substrate surface. When the laser beam is well focused, this impact can be sufficient enough to sputter the mold flash that is already cleaved from the metal, away from the lead frame. By the combination of these two mechanisms, the mold flash can be efficiently removed from the lead frame and the surface can be cleaned of contaminants.

Figure 5A:
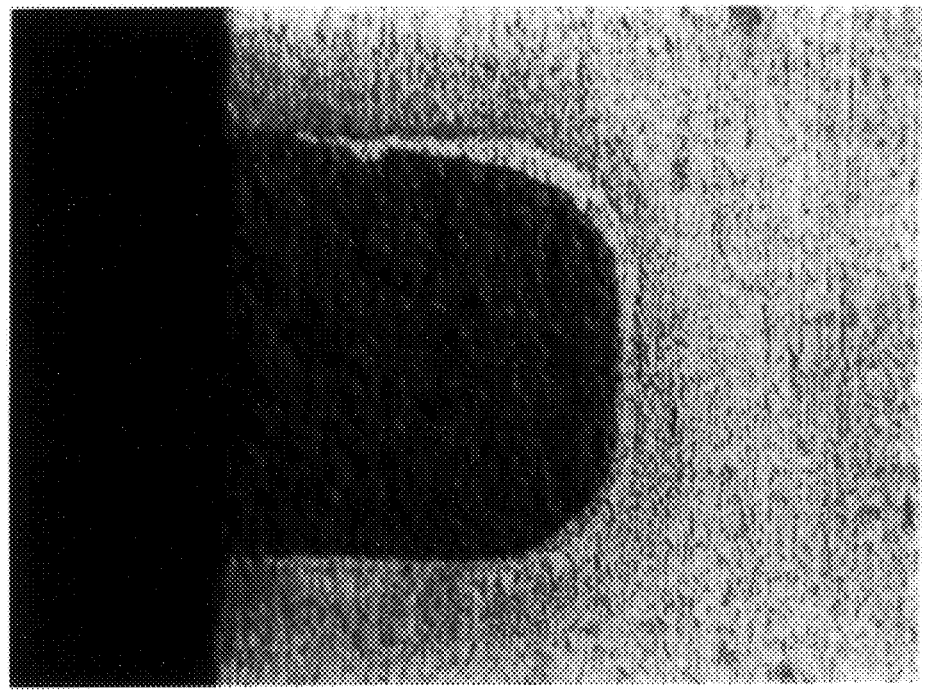
FIG. 5(a) is a microscopic photograph of an interface hole of the IC package filled with mold flash before laser irradiation.
Figure 5B:
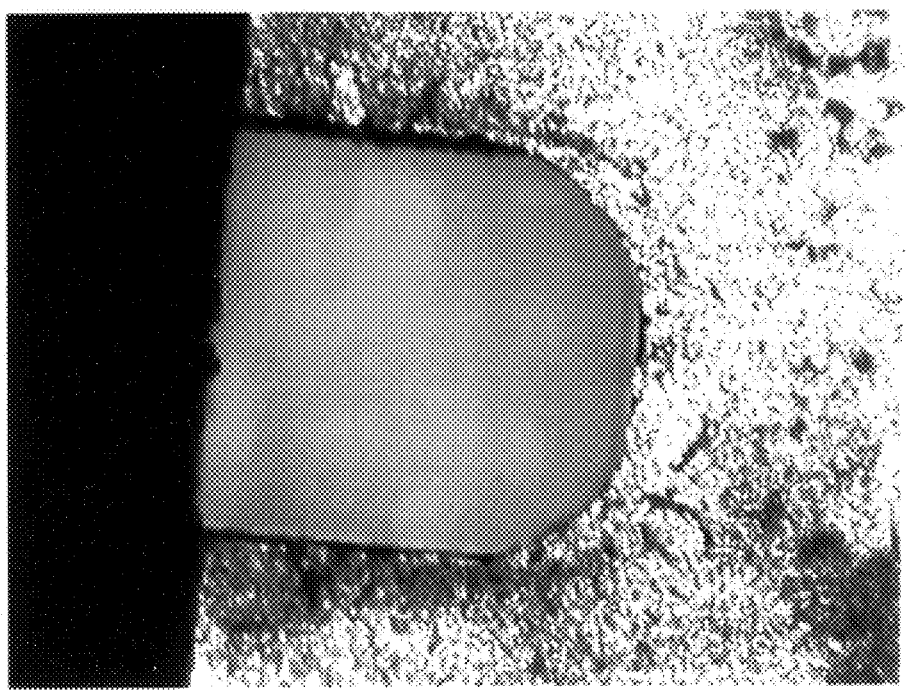
FIG. 5(b) is a microscopic photograph of the interface hole of the IC package with mold flash removed by laser irradiation. A clean hole can be observed.

FIG. 5(a) and FIG. 5(b) show an example of laser removal of mold flash which is filled in the holes at the lead frame interface. FIG. 5(a) is a microscopic photograph of an interface hole of the IC package filled with mold flash before laser irradiation. The mold material for this IC package is plastic. When the KrF excimer laser is focused to reach an intensity of more than 1 J/cm$^2$, the mold flash on the metal surface as well as in the interface holes of the lead frame can be removed by several laser pulses. FIG. 5(b) is a microscopic photograph of the interface hole of the IC package after the mold flash is removed by laser irradiation. A clean hole can be observed.

Figure 6A:
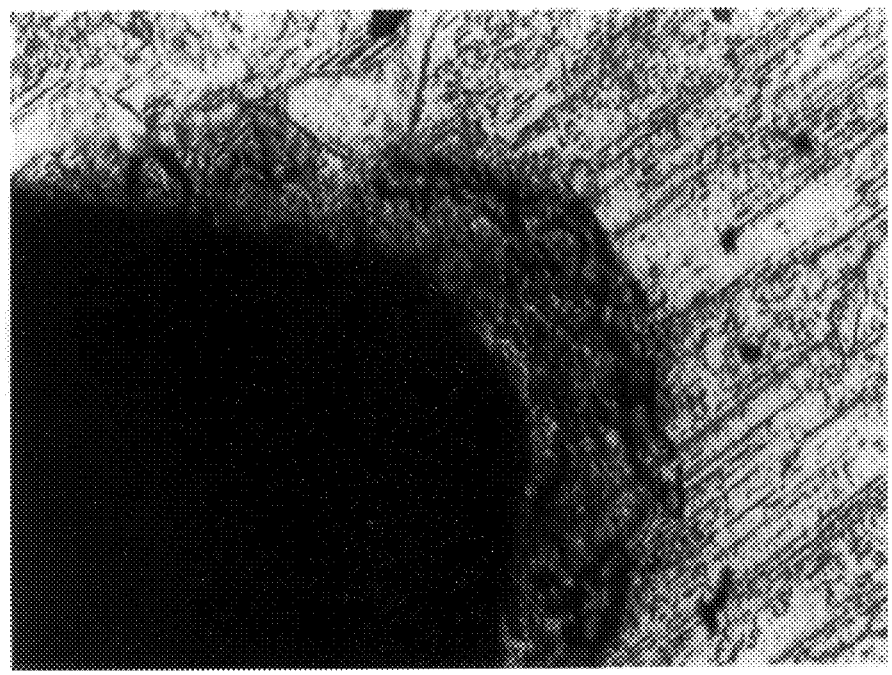
FIG. 6(a) is a microscopic photograph of a corner of the IC package attached with mold flash before laser irradiation.
Figure 6B:
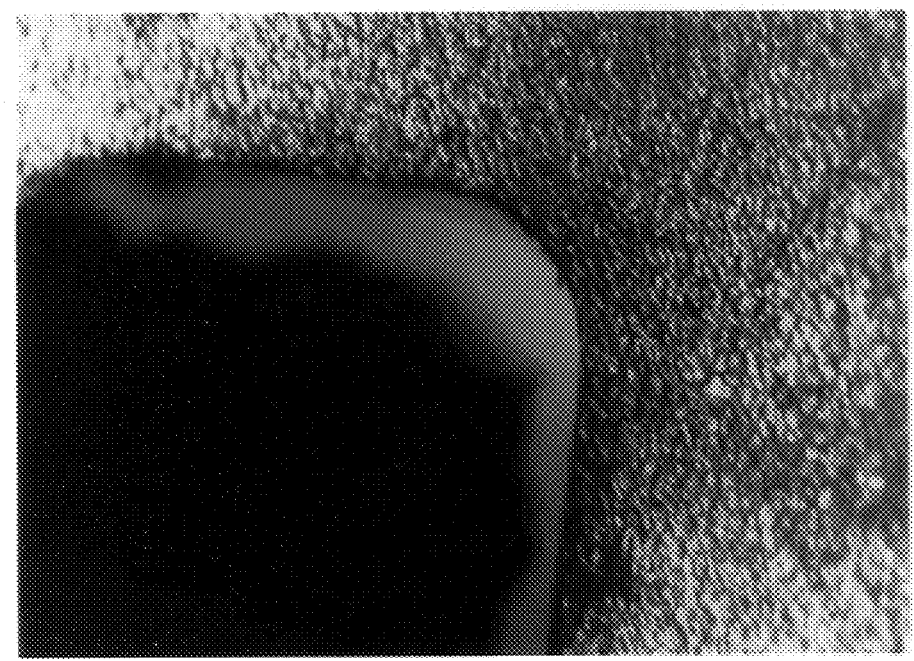
FIG. 6(b) is a microscopic photograph of the corner of the IC package with mold flash removed by laser irradiation. A clean metal surface for the lead frame can be observed.

FIG. 6(a) and FIG. 6(b) show another example of laser removal of mold flash. FIG. 6(a) is a microscopic photograph of a corner of the lead frame in the IC package attached with mold flash before laser irradiation under the same condition as used in FIG. 5(a) and FIG. 5(b). The mold flash can be removed from the frame surface and the space between the frame and the molded package. FIG. 6(b) is a microscopic photograph of the corner of the IC package after laser irradiation. A clean metal surface for the lead frame can be observed.

The effect of ambient oxygen and carbon on the substrate surface is very little in the short wavelength pulse laser induced removal of mold flash. Firstly, the molecule movement in air at room temperature is estimated to be under 0.1 micron within a 20 ns time interval. Secondly, there are reaction products flying out explosively during the laser pulse. Therefore, the probability for a molecule to react with the substrate surface is negligible.

In the above-mentioned examples, a KrF excimer laser is used as a short wavelength pulse laser. In fact, besides the KrF excimer laser, other lasers such as an XeCl excimer laser (wavelength 308 nm), an ArF excimer laser (wavelength 193 nm), a solid laser and a semiconductor laser which can produce a pulse beam with short wavelength can also be used for this dry cleaning process. By short wavelength, it is meant wavelengths less than approximately 550 nm. The pulse width can also be selected within a range.

Furthermore, this dry processing in air can allow real-time in-situ monitoring by a laser probe system (12).

In summary, this invention has the following effects and advantages.

When the lead frame of IC packages attached mold flash is irradiated by pulse laser with short wavelength and high intensity, the mold flash attached on the lead frame surface and filled in the interface holes can be removed completely and efficiently in the air. A laser probe system can be used for real-time monitoring of the process to remove the mold flash.

Therefore, this invention has the effects and advantages that (1) This invention is a method to remove mold flash from a metal lead frame of an IC package and other electric components by using laser irradiation.

(2) This is a dry process which does not use water and other chemical solutions.

(3) This method uses a laser as an energy source in removing mold flash, the laser has a pulse with short wavelength.

(4) This method uses the mechanisms of metal expansion by laser heating, and momentum transferring from laser pulse to remove mold flash.

(5) This method can have a real-time monitoring system such as CCD camera and/or a laser/detector set.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A short wavelength laser apparatus for removing mold flash from a substrate, comprising:
    a short wavelength pulse laser generator, wherein a wavelength of a laser beam generated by said pulse laser generator is less than 550 nm;
    an aperture through which said laser beam generated by said pulse laser generator is passed;
    a focusing lens for focusing said laser beam after said laser beam passes through said aperture;
    a transparent holding means for holding a substrate while the substrate is treated with a focused laser beam; and
    a monitoring laser means for monitoring the removal of mold flash from said substrate, said monitoring laser means including a monitoring laser generator disposed on one side of said transparent holding means, a photodetector disposed on an opposite side of said transparent holding means, a first convex lens disposed on said one side of said transparent holding means, and a second convex lens disposed between said transparent holding means and said photodetector; wherein
    said laser beam removes mold flash by both heating the mold flash and providing a momentum pressure force upon the mold flash.

2. The short wavelength pulse laser apparatus according to claim 1, wherein said short wavelength laser generator is a KrF excimer laser generator.

3. The short wavelength laser apparatus according to claim 1, wherein said transparent holding means is a conveyor.

4. The short wavelength laser apparatus according to claim 3, further comprising aperture moving means for adjusting a position of said aperture.

5. The short wavelength laser apparatus according to claim 4, further comprising lens moving means for adjusting a position of said focusing lens.

6. The short wavelength laser apparatus according to claim 5, further comprising a conveyor speed controller.

7. The short wavelength laser apparatus according to claim 6, further comprising control means for controlling said short wavelength pulse laser generator, said monitoring laser means, said conveyor speed controller, said aperture moving means and said lens moving means.

8. The short wavelength laser apparatus according to claim 1, further comprising control means for controlling said short wavelength pulse laser generator and said monitoring laser means.

9. A method for removing mold flash from a substrate using a short wavelength laser, comprising the steps of:
    generating a short wavelength pulse laser beam having a wavelength less than 550 nm;
    passing said short wavelength pulse laser beam through an aperture;
    holding said substrate on a transparent substrate holder;
    focusing said pulse laser beam on a portion of mold flash to be removed from said substrate by passing said pulse laser beam through a focusing lens after said pulse laser beam passes through said aperture, such that said pulse laser beam removes mold flash from said substrate by both heating and providing a momentum pressure force upon the mold flash; and
    monitoring the removal of mold flash from said substrate, said monitoring including utilizing a monitoring laser generator disposed on one side of said transparent substrate holder, a photodetector disposed on an opposite side of said transparent substrate holder, a first convex lens disposed on said one side of said transparent substrate holder, and a second convex lens disposed between said transparent substrate holder and said photodetector.

10. A short wavelength laser apparatus for removing mold flash from a substrate, comprising:
    a short wavelength pulse laser generator, wherein a wavelength of a laser beam generated by said laser generator is less than 550 nm;
    a focusing lens for focusing said laser beam;
    a transparent holding means for holding a substrate while the substrate is treated with a focused laser beam; and
    a monitoring laser means for monitoring the removal of mold flash from said substrate, said monitoring laser means including a monitoring laser generator disposed on one side of said transparent holding means, a photodetector disposed on an opposite side of said transparent holding means, a first convex lens disposed on said one side of said transparent holding means, and a second convex lens disposed between said transparent holding means and said photodetector; wherein
    said pulse laser beam removes mold flash by both heating the mold flash and providing a momentum pressure force upon the mold flash.

11. The short wavelength laser apparatus according to claim 10, wherein said short wavelength pluse laser generator is a KrF excimer laser generator.

12. The short wavelength laser apparatus according to claim 10, wherein said transparent holding means is a conveyor.

13. The short wavelength laser apparatus according to claim 10, further comprising lens moving means for adjusting a position of said focusing lens.

14. The short wavelength laser apparatus according to claim 13, further comprising a conveyor speed controller.

15. The short wavelength pulse laser apparatus according to claim 14, further comprising control means for controlling said short wavelength pulse laser generator, said monitoring laser means, said conveyor speed controller, said aperture moving means and said lens moving means.

16. The short wavelength laser apparatus according to claim 15, further comprising control means for controlling said short wavelength pulse laser generator and said monitoring laser means.

17. A method for removing mold flash from a substrate using a short wavelength laser, comprising the steps of:

generating a short wavelength pulse laser beam having a wavelength less than 550 nm;

holding said substrate on a transparent substrate holder;

focusing said pulse laser beam on a portion of mold flash to be removed from said substrate by passing said pulse laser beam through a focusing lens such that said pulse laser beam removes mold flash from said substrate by both heating and providing a momentum pressure force upon the mold flash; and monitoring the removal of mold flash from said substrate, said monitoring including utilizing a monitoring laser generator disposed on one side of said transparent substrate holder, a photodetector disposed on an opposite side of said transparent substrate holder, a first convex lens disposed on said one side of said transparent substrate holder, and a second convex lens disposed between said transparent substrate holder and said photodetector.

* * * * *